Patented Mar. 9, 1954

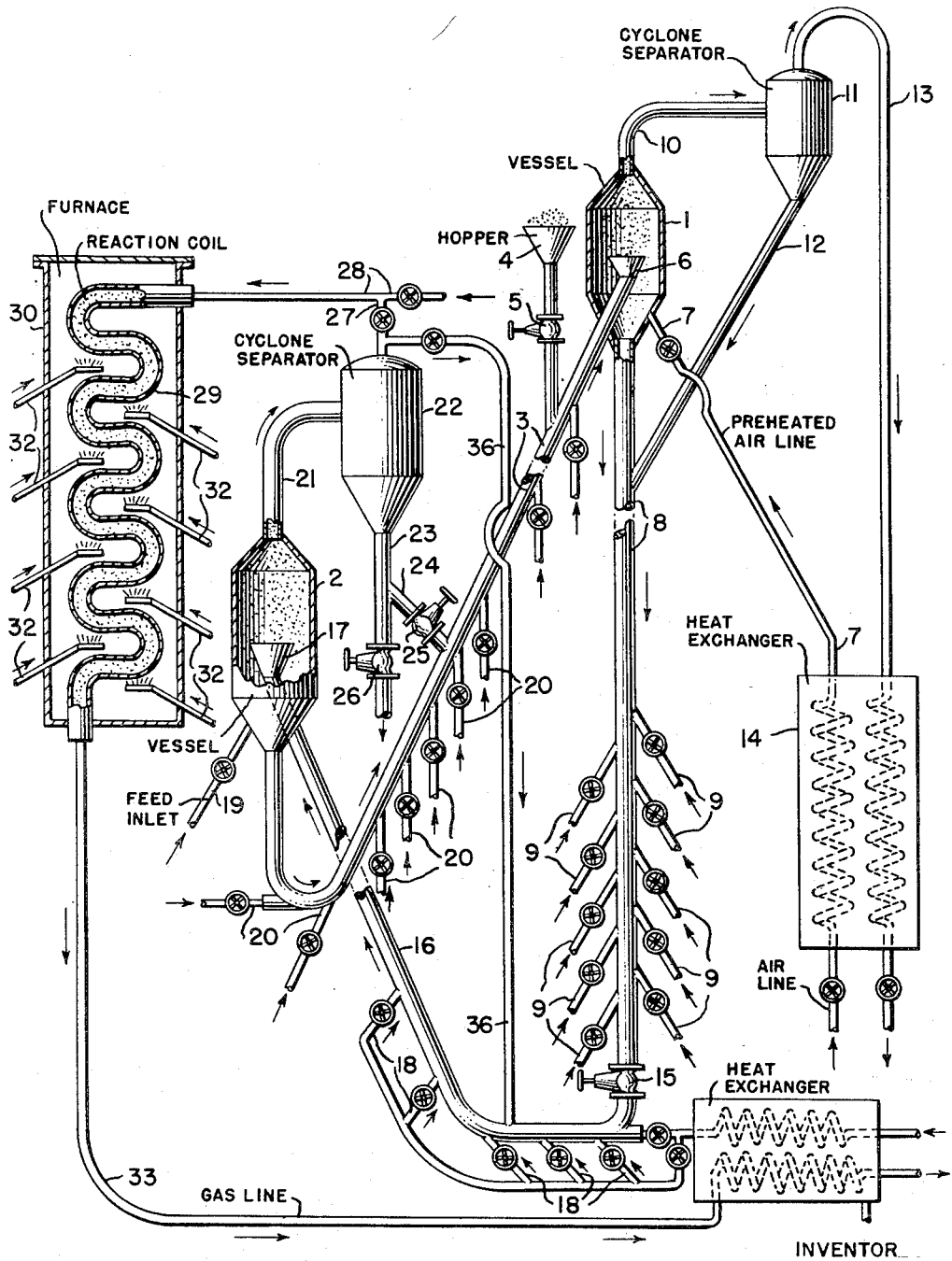

2,671,721

UNITED STATES PATENT OFFICE 2,671,721

PRODUCTION OF INDUSTRIAL GAS COMPRISING CARBON MONOXIDE AND HYDROGEN

Edwin R. Gilliland, Arlington, Mass., assignor to Standard Oil Development Company, a corporation of Delaware Application August 3, 1946, Serial No. 688,353

1 Claim. (Cl. 48—196)

The present invention is directed to a method for producing industrial mixtures of carbon monoxide and hydrogen.

In many industrial processes, the raw material is composed of a mixture of carbon monoxide and hydrogen. Chief among these processes is the so-called methanol synthesis, in which carbon monoxide and hydrogen are reacted in the presence of a suitable catalyst to produce oxygenated organic compounds, and the Fischer-Tropsch synthesis, in which carbon monoxide and the hydrogen, in suitable proportions, are reacted in the presence of a suitable catalyst and under selected conditions to produce a product primarily composed of liquid hydrocarbons. In processes of this type, it is highly desirable that the feed gas be free from contamination with inert gaseous substances.

The obvious way to obtain a mixture of carbon monoxide and hydrogen is to subject a mixture of a hydrocarbon, such as methane, and air to controlled combustion. This procedure, however, results in a gas containing a large quantity of nitrogen. This detrimental dilution has led to much study and experimentation, directed toward the development of a method for producing the desired "make gas" free from contaminants and diluents.

One procedure which has been suggested is to use a metal as an oxygen carrier, said metal being first reacted with air to produce an oxide, which then is reacted with the hydrocarbon to produce a mixture of carbon monoxide and hydrogen. Most of the metals useful for this purpose which do not introduce physical difficulties, of which iron is a typical example, are subject to the defect that reaction of their oxides with a hydrocarbon does not produce the desired mixture of carbon monoxide and hydrogen, but produces a conglomeration of gases of which carbon monoxide and hydrogen constitute only a minor part. For example, using iron as an illustration, there are several reactions involved when the oxide is reacted with a hydrocarbon, such as methane. The oxide can react with methane to produce carbon dioxide and hydrogen. These can also react to produce carbon dioxide and hydrogen. Both of these reactions are fairly slow. The hydrogen produced, on the other hand, reacts rapidly with the iron oxide to produce iron and water. Likewise, the carbon monoxide can react with iron oxide to produce iron and carbon dioxide. Again, the hydrogen produced reacts fairly rapidly with the carbon dioxide to produce water and carbon monoxide. The reduced iron at the temperature of operation is a very active cracking catalyst for the hydrocarbon, converting it to carbon and hydrogen. The carbon produced reacts fairly rapidly with water to produce carbon monoxide or carbon dioxide and hydrogen. The over-all tendency, therefore, is to produce a gas containing substantial amounts of carbon dioxide and water as well as some unreacted hydrocarbon.

According to the present invention, the composition of the product gas in a process of the aforesaid type is adjusted in the direction of increased production of carbon monoxide and hydrogen by subjecting the product of this reaction to a reforming operation in which the gas resulting from the reaction between the metal oxide and the hydrocarbon, preferably after adjustment of its hydrocarbon content, is contacted with a suitable catalyst at elevated temperature and pressure to effect a combination of reactions, including the reaction of carbon dioxide with hydrocarbon to produce carbon monoxide and hydrogen, and the reaction of water with hydrocarbon to produce carbon monoxide and hydrogen.

The present invention contemplates a process in which a suitable metal, such as iron, is subjected to oxidation by air, its oxide is reacted with a hydrocarbon, such as methane, and the gaseous product of this reaction is passed over a reforming catalyst, such as iron or nickel, as such or in combination with suitable carriers such as alumina, magnesia or the like. The present invention also contemplates such operations in which the oxidation of the metal is conducted at substantially atmospheric pressure, while the reaction between the metal oxide and the hydrocarbon and the reforming step are conducted at elevated pressures. More specifically, the present invention contemplates the employment of finely divided metal oxide, the maintenance of this material in the process in a fluidized state, and the utilization of the fluidized metal oxide to produce a pressurehead for the portions of the process to be conducted under pressure, by locating the vessel in which the oxidation of the metal is performed at a considerably higher level than the other vessels and connecting of the former with the latter by a standpipe in which the metal oxide is maintained in a fluidized state, in which it exhibits the hydraulic and hydrodynamic properties of a liquid.

The present invention also envisages, in a specific embodiment, a control of the reaction between the hydrocarbon and the metal oxide in such a manner than substantially no free metal is formed in this reaction. To this end, the metal oxide employed is one which has a plurality of oxides and a higher oxide thereof is employed. A sufficiently large body of metal oxide with respect to the feed of hydrocarbon therethrough is maintained in a fluidized condition so that ample oxygen is available for the conversion of the hydrocarbon, even to $CO_2$ and water, without formation of free metal. If the allowable quantity of hydrocarbon feed for this purpose is inadequate to fluidize the finely divided metal oxide properly, it may be augmented by recycling the product gas of this reaction through the reaction zone.

The present invention may be clearly understood by the following detailed description of the accompanying drawing, in which the single figure is a front elevation in diagrammatic form of one type of apparatus suitable for the practice of the present invention.

Referring to the drawing in detail, numeral 1 designates a vessel in which the metal is converted to its oxide, while numeral 2 designates a similar vessel in which the metal oxide is reacted with a hydrocarbon. The metal is introduced as its oxide in finely divided form into vessel 1 by way of a feed pipe 3, which may be provided with a hopper 4, connected to pipe 3 through a suitable valve 5, such as a slide valve or a star wheel, for controlling the flow of finely divided solids to provide for the introduction of metal oxide into the system. The feed pipe 3 terminates in vessel 1 in a funnel-shaped member 6, spaced from the bottom thereof.

This oxide together with finely divided metal from 2 mixed with gas enters the vessel in the form of a suspension which spouts upwardly from the funnel 6, much in the same manner as water in a fountain. At the same time, preheated air is introduced into the bottom of the vessel through line 7 at a velocity such as to maintain the finely divided metal in suspension in the vessel for a predetermined period of time, depending on the particle size distribution of the metal and the velocity of the gases.

As has been indicated, in the preferred embodiment of the present invention, the metal and the metal oxide are employed in finely divided form and maintained in the fluidized condition. In this type of operation, the finely divided solid preferably contains no particles larger than 10 mesh, with a major portion of the particles being smaller than 100 mesh, this latter portion including particles as small as 20 microns or less in diameter. Good fluidization is pomoted by providing particles of sizes covering a wide range. For example, if about 30% of the particles are smaller than 80 microns in diameter, larger particles up to 10 mesh may be tolerated. If difficulty is encountered in the fluidization of free metal, this may be mitigated by employing a light, finely divided power such as magnesia or clay in conjunction with the metal, either as a mechanical mixture therewith or in the form of a support upon which the metal is deposited.

When it is desired to maintain a finely divided solid in a fluidized state in such a manner as to establish a suspension of the solid having a high density, say of at least 20 pounds per cubic foot, with a solid having a specific gravity of about 2.4, the velocity of the fluidizing gas must be adjusted with reference to the particle size and particle size distribution of the finely divided solid. For most materials, a suitable gas velocity for this purpose is within the range of .5 to about 7 feet per second. With heavier materials, the velocity is in the upper end of this range. Generally a velocity within the range of 1 foot to 5 feet per second is satisfactory with materials of the type referred to herein.

The reaction which is conducted in vessel 1 is exothermic. This reaction proceeds rapidly at temperatures between about 1700 and 2100° F. If the temperature tends to become excessive, it can be maintained at the desired level by feeding in less highly preheated air or even steam.

When the reaction in vessel 1 is in progress, the finely divided metal and metal oxide are in the form of a dense suspension in the upflowing air above the funnel 6. The upper level of this dense suspension may be regulated by suitably adjusting the velocity of the air and the rate of feed of the solid. The finely divided solid continuously falls out of said dense suspension and leaves the bottom of vessel 1 through standpipe 8, which is provided with suitably arranged injection nozzles 9, through which may be injected puffs of air or steam to keep the solid in the standpipe in a fluidized condition. Some solid will be carried off overhead from vessel 1 through line 10, and this is knocked out of the exit gas in a suitable separator 11, such as a cyclone separator. The recovered solid is conveyed from the separator to standpipe 8 by line 12. The combustion gases leave the top of the separator through line 13 and pass through a heat exchanger 14, in which they impart heat to the incoming air in line 7.

Methane or other hydrocarbon, preferably preheated, is injected at the bottom of standpipe 8 at a point below a suitable valve 15 in standpipe 8, which controls the rate of discharge of solid from the standpipe. The mixture of hydrocarbon and solid oxide passes through line 16, which terminates in a funnel-shaped member 17 at an intermediate point in vessel 2. Additional hydrocarbon may be injected at spaced points 18 along the line 16 to facilitate movement of the solid. Some reaction between the hydrocarbon and the oxide occurs in line 16, and this reaction is desirable.

Again, the rates of feed of the hydrocarbon and the oxide are adjusted so as to maintain in vessel 2 above funnel 17 a dense suspension of the solid particles in the upflowing gases. Additional hydrocarbon may be fed into the bottom of vessel 2 through line 19. The temperature in this vessel is maintained within the range of about 1600 to 2000° F. The heat required for the reaction is carried in by the finely divided solid which absorbs heat in vessel 1. For this purpose, it is particularly desirable to have a large amount of inert solid having a fairly high heat capacity in the circulation of solid particles. The materials heretofore mentioned as fluidizing aids may serve this purpose to some extent, and they may be supplemented by other finely divided solids of high heat capacity, such as sand. Alundum, employed as a carrier for the metal, functions well, both as a fluidizing aid and a heat carrier.

Reduced metal oxide, preferably in the form of a lower oxide, drops out of the dense phase in vessel 2 into line 3, which is connected to vessel 2 as a bottom draw-off. This line is provided with suitably spaced nozzles 20, through which a suitable gas, such as air or steam, may be injected to facilitate movement of the solid through line 3.

The gases leaving the vessel 2 overhead through line 21 discharge into a cyclone separator or other suitable separator for solids and gases 22, from which the separated solid leaves the bottom through draw-off 23. This recovered solid may be fed into line 3 by way of branch line 24 provided with a suitable control valve 25. Draw-off 23 is also provided with a suitable valve 26, through which any desired quantity of the solid may be removed from the system. Removal of this solid in small quantities from time to time may be desirable in the event that the solid becomes contaminated in such a way as to interfere with its efficiency as an oxygen carrier.

The gases leaving the upper end of separator 22 through line 27 will contain hydrogen, carbon monoxide, carbon dioxide, steam and some unconverted hydrocarbon. The amount of supplemental hydrocarbon to be added should be that required for reaction with the carbon dioxide and steam in the gas mixture in line 27. Periodic analysis of this latter gas mixture will serve as a guide to the amount of supplemental hydrocarbon required. This gas is preferably mixed with a further quantity of hydrocarbon which may be preheated and introduced by way of line 28. The resulting mixture passes through a reformer coil 29, arranged in a furnace 30 and packed with a suitable reforming catalyst 31, which may be iron or nickel or a combination of these, preferably supported on a carrier such as Alundum or magnesia. The burners 32 of the furnace are operated so as to maintain a temperature in the reforming zone in the range of about 1500 to 1900° F. The reformed gas, consisting predominantly of carbon monoxide and hydrogen leaves the reforming zone through line 33 and passes through a heat exchanger 34, in which it gives up heat to the hydrocarbon feed to zone 2. Sufficient heat is recovered from this product gas to raise the temperature of the hydrocarbon feed to about 500° F., leaving the product gas at a temperature suitable for immediate use in a synthesis of the type heretofore mentioned. It may be pointed out here that by suitably adjusting the height of the standpipe 8, a pressure upwards of about 200 pounds may be provided in the reactions in vessel 2 and reformer 29, whereby the product gas is recovered at a pressure which may amount to the whole or a large part of that suitable for direct use in a Fischer-Tropsch synthesis. In the event that the allowable hydrocarbon feed to reactor 2 is inadequate properly to fluidize the solid therein, a suitable amount of product gas may be recycled to line 16 or reactor 2 through line 36.

It will be understood that the process described above is susceptible to many changes within the province of those skilled in the art. The reforming catalyst mentioned may be replaced by others, and the design of the reformer unit may be changed without altering the character of the process. Likewise, while iron has been mentioned as the oxygen carrier for illustrative purposes, it will be clear that other metals capable of being oxidized by air and giving up their oxygen under the conditions obtaining in vessel 2 may be employed.

The nature and objects of the present invention having been thus described and illustrated, what is claimed as new and useful and is desired to be secured by Letters Patent is:

A method for producing a mixture of carbon monoxide and hydrogen from a gaseous hydrocarbon, which comprises feeding the hydrocarbon into a reaction zone, simultaneously feeding to said reaction zone an oxide of a metal in finely divided form in an amount substantially in excess of that stoichiometrically necessary to convert all the carbon in the hydrocarbon to an oxide of carbon, the said finely divided metal oxide being established in the form of an elongated vertical fluidized column of said finely divided metal oxide of sufficient height to exert a pressure at near the bottom of said column of upwards of 200 pounds per square inch, which thus pressurized metal oxide is withdrawn from the bottom of said column and fed to said reaction zone, maintaining in said reaction zone a temperature suitable for the reaction between the metal oxide and the hydrocarbon, maintaining a pressure in said reaction zone of upwards of 200 pounds per square inch, controlling the feed rate of the gaseous hydrocarbon so as to maintain the finely divided solid in said zone in a highly turbulent dense suspension and fluidized state, continuously withdrawing solid, finely divided metal oxide particles of reduced oxygen content downwardly from the bottom of said reaction zone, discharging the withdrawn metal oxide particles into a transfer line and conveying them to a reoxidizing zone, treating said particles with air at substantially atmospheric pressure to convert the metal oxide particles to higher oxides, discharging the higher oxide particles from said reoxidizing zone to the top of said vertical, fluidized column for recycling to the said reaction zone, recovering a product gas from said reaction zone and passing it in admixture with a gaseous hydrocarbon over a reforming catalyst at a temperature suitable for the reaction of water and carbon dioxide with said hydrocarbon to form a mixture of carbon monoxide and hydrogen and recovering said mixture under a pressure of upwards of 200 pounds per square inch.

EDWIN R. GILLILAND.

References Cited in the file of this patent

UNITED STATES PATENTS

| Number | Name | Date |
| --- | --- | --- |
| 1,899,184 | De Simo | Feb. 28, 1933 |
| 1,957,743 | Wietzel et al. | May 8, 1934 |
| 2,042,285 | Wilke et al. | May 26, 1936 |
| 2,425,754 | Murphree et al. | Aug. 19, 1947 |
| 2,438,728 | Tyson | Mar. 30, 1948 |
| 2,490,986 | Symonds | Dec. 13, 1949 |
| 2,532,514 | Phinney | Dec. 5, 1950 |